US 8,259,085 B2

(12) United States Patent
Kobayashi (10) Patent No.: US 8,259,085 B2
(45) Date of Patent: Sep. 4, 2012

(54) INFORMATION TERMINAL DEVICE HAVING A CLEANING MODE FOR CLEANING TOUCH PANEL AND OPERATION BUTTON

(75) Inventor: Takashi Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 12/535,155

(22) Filed: Aug. 4, 2009

(65) Prior Publication Data

US 2010/0033444 A1 Feb. 11, 2010

(30) Foreign Application Priority Data

Aug. 6, 2008 (JP) ................................. 2008-202817

(51) Int. Cl.
*G06F 3/041* (2006.01)
(52) U.S. Cl. ........................................ 345/173; 345/174
(58) Field of Classification Search ........... 345/173–178
See application file for complete search history.

(56) References Cited

U.S. PATENT DOCUMENTS

| 4,952,932 | A | * | 8/1990 | Sugino et al. | 341/23 |
|---|---|---|---|---|---|
| 4,992,779 | A | * | 2/1991 | Sugino et al. | 345/173 |
| 5,526,422 | A | * | 6/1996 | Keen | 379/396 |
| 6,208,331 | B1 | * | 3/2001 | Singh et al. | 345/173 |
| 2001/0040693 | A1 | | 11/2001 | Saito et al. | |

FOREIGN PATENT DOCUMENTS

| JP | 06168072 A | * | 6/1994 |
|---|---|---|---|
| JP | 2000-194504 | | 7/2000 |
| JP | 2000347723 A | * | 12/2000 |
| JP | 2003091370 A | * | 3/2003 |
| JP | 2004265383 A | * | 9/2004 |

OTHER PUBLICATIONS

Machine Translation of JP-2004265383.*
Machine Translation of JP-2000347723.*
Machine Translation of JP-2003091370.*
English Language Machine Translation of JP-06168072A.*
English language Abstract of JP 2000-194504, Jul. 14, 2000.

* cited by examiner

*Primary Examiner* — Jason Mandeville
(74) *Attorney, Agent, or Firm* — Greenblum & Bernstein, P.L.C.

(57) ABSTRACT

An information terminal device has a touch panel and a display unit which are integrally configured, and an operation button provided around the display unit, and the information terminal device includes: a touch number counting unit operable to count number of times of touching the operation button; a touch number storing unit operable to store the number of times counted by the touch number counting unit; and a control unit operable to control the information terminal device by switching an operation mode between a normal mode for working the information terminal device according to operations of the touch panel and the operation button and a cleaning mode for cleaning the touch panel, wherein in the cleaning mode, the control unit prohibits an application from being executed according to operations of the touch panel and the operation button, and terminates the cleaning mode when the number of times of touching the operation button counted by the touch number counting unit reaches a predetermined number.

3 Claims, 6 Drawing Sheets

LIST OF TODAY'S APPOINTMENTS, JUNE, 15, A.M.

| | |
|---|---|
| 9:00-9:30 MATSUSHITA ICHIRO | 9:30-10:00 MATSUSHITA SABURO |
| 9:00-9:30 MATSUSHITA JIRO | 9:30-10:00 MATSUSHITA SHIRO |
| 9:00-9:30 * * * * * * * * | 9:30-10:00 * * * * * * * * |
| 9:00-9:30 * * * * * * * * | 9:30-10:00 * * * * * * * * |
| 9:00-9:30 * * * * * * * * | 9:30-10:00 * * * * * * * * |
| 9:00-9:30 * * * * * * * * | 10:00-10:30 * * * * * * * * |
| 9:00-9:30 * * * * * * * * | 10:00-10:30 * * * * * * * * |

INFORMATION TERMINAL DEVICE HAVING A CLEANING MODE FOR CLEANING TOUCH PANEL AND OPERATION BUTTON

BACKGROUND OF THE INVENTION

1. Technical Field

The present invention relates to an information terminal device which includes a touch panel having a touch input function on a display unit, and in particular, to an information terminal device that is further provided with operation buttons of such as push type around the display unit in addition to the touch panel.

2. Related Art

In recent years, portable information terminal devices such as PDAs and tablet PCs have been spreading rapidly. It is difficult to use a keyboard and a mouse with such a portable information terminal device, due to demands for improved usability as well as size and weight reduction. Accordingly, many information terminal devices are provided with a touch panel having transparent thin film electrodes (operation keys) provided so as to overlap a display unit, and are configured such that an input operation is carried out by a stylus or a finger on the operation keys displayed on the display unit.

While the finger input is convenient, the finger touching the touch panel makes a surface of the touch panel smudgy and reduces visibility of the touch panel. Accordingly, cleaning of the smudge on the surface of the touch panel is required. Further, as the smudge of the touch panel is contaminated and unsanitary, it is necessary to clean and sterilize the touch panel on a regular basis when the information terminal devices are used in medical institutions such as hospitals.

When cleaning the touch panel, in order to prevent malfunction, it is necessary to turn off a power switch so as to prohibit inputs from keys. However, as the touch panel is a transparent sheet and the smudge is not easily noticeable, it is not easy to recognize whether or not the smudge has been sufficiently wiped if the cleaning is carried out while the power is turned off. Therefore, an information terminal device has been proposed, for example, that is provided with a cleaning mode for cleaning the touch panel, and capable of, in the cleaning mode, disabling inputs from operation keys of the touch panel while the power is turned on, showing an entire area of the display unit in a single color, and detecting a portion that has been wiped and clearing the single color or turning into a different color, thereby making the wiped portion to be recognizable.

In this case, the information terminal device disclosed in JP-A-2000-194504 sets a time period of the cleaning mode to a predetermined time period, and disables inputs from operation keys until the set predetermined time period lapses when the cleaning mode is selected by the user, thereby preventing malfunction.

However, since the information terminal device described in JP-A-2000-194504 does not consider a degree of wiping, when the predetermined time period of the cleaning mode for a switch having large number of times of touching and large degree of smudge is short, there is often a case in which the smudge cannot be sufficiently removed by the wiping of this predetermined time period. Further, information terminal devices of this type are often provided with push type operation buttons such as the power switch around the display unit, but the conventional information terminal devices have not considered cleaning of the operation buttons provided around the display unit.

SUMMARY OF THE INVENTION

In view of the above problems, an object of the present invention is to provide an information terminal device capable of removing smudge of switches provided for the information terminal device more sufficiently. In particular, the present invention aims to provide an information terminal device capable of removing smudge of push type operation buttons such as a power switch provided around a display unit more sufficiently.

To achieve the above object, an information terminal device according to the present invention has a touch panel and a display unit which are integrally configured, and an operation button provided around the display unit, and the information terminal device includes: a touch number counting unit operable to count number of times of touching the operation button; a touch number storing unit operable to store the number of times counted by the touch number counting unit; and a control unit operable to control the information terminal device by switching an operation mode between a normal mode for working the information terminal device according to operations of the touch panel and the operation button and a cleaning mode for cleaning the touch panel, wherein in the cleaning mode, the control unit prohibits an application from being executed according to operations of the touch panel and the operation button, and terminates the cleaning mode when the number of times of touching the operation button counted by the touch number counting unit reaches a predetermined number.

According to the present invention, as the cleaning mode continues until number of times of touching the operation button reaches the predetermined number, a user can sufficiently carry out the cleaning. Further, as the execution of the application is prohibited in the cleaning mode, the user can carry out the cleaning of the operation button without considering malfunction by touching the operation button.

When a plurality of operation buttons are provided, the touch number counting unit may count the number of times of touching each operation button, and the control unit may terminate the cleaning mode when the numbers of touching the operation buttons counted by the touch number counting unit reach corresponding predetermined numbers in the cleaning mode.

With this configuration, the cleaning can be carried out until the cleaning of all the operation buttons is completed. It is possible to clean smudge of the operation buttons uniformly and sufficiently.

The touch number counting unit may count the number of times of touching each operation button in the normal mode, and the predetermined number for each operation button may be determined when the cleaning mode starts, based on the number of times of touching each operation button counted in the normal mode and stored in the touch number storing unit.

With this configuration, the operation button with larger number of times of touching in the normal mode (that is, the operation button which easily become dirty) can be more sufficiently cleaned, thereby allowing efficient cleaning.

In the cleaning mode, the information terminal device may display, on the display unit, a name of the operation button of which number of times of touching is below the predetermined number when and after the number of times of touching at least one of the plurality of operation buttons reaches the predetermined number.

With this configuration, the user can carry out the cleaning while confirming the operation button, cleaning of which is insufficient, thereby allowing efficient cleaning.

The termination of the cleaning mode is preferably executed when two or more of the plurality of operation buttons are pressed at the same time after the numbers of times of touching the operation buttons counted by the touch number counting unit reach the corresponding predetermined number.

With this configuration, it is possible to avoid the cleaning mode to be terminated when two adjacent buttons are accidentally pressed at the same time.

According to the information terminal device of the present invention, as the completion of the cleaning is determined based on the number of times of touching the operation button, it is possible to sufficiently remove the smudge of the operation buttons provided for the information terminal device.

BRIEF DESCRIPTION OF THE DRAWINGS

FIGS. 5A and 5B show display examples notifying that the cleaning is required in the information terminal device of the embodiment according to the present invention.

FIGS. 8A and 8B show a diagram illustrating a dirty pattern of the information terminal device of the embodiment according to the present invention.

FIGS. 10A, 10B, and 10C show display examples of notifications relating to the cleaning of the information terminal device of the embodiment according to the present invention.

DETAILED DESCRIPTION OF THE PREFERRED EMBODIMENTS

The following describes an embodiment according to the present invention with reference to the drawings in detail.

1. Configuration of Information Terminal Device

Figure 1:
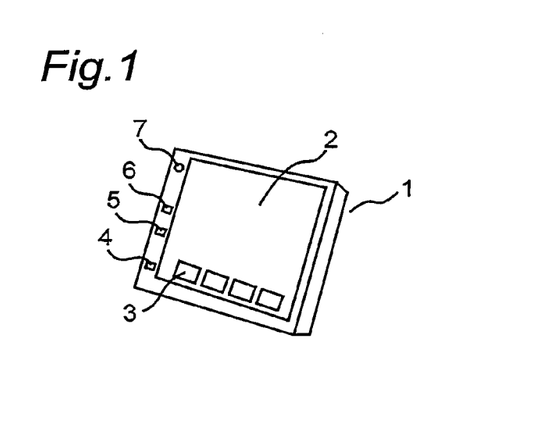
FIG. 1 is an external view of a tablet type information terminal device of one embodiment according to the present invention.

FIG. 1 is an external view of a tablet type information terminal device of an embodiment according to the present invention. An information terminal device 1 of this embodiment determines whether or not cleaning of the operation buttons has been completed based on number of times of pressing (number of times of touching) push type operation buttons provided around a display unit, thereby allowing more sufficient cleaning of the operation buttons. In the following description, operating operation keys of a touch panel is called "touch" and operating the push type operation buttons is called "press" in most part. However, the "touch" and "press" represent the similar action, and both of "touch" and "press" refer to an operation of a switch (the operation keys and the operation buttons) or a touching motion to the switch.

The information terminal device 1 of this embodiment has, on a surface thereof, a display unit 2 that is a liquid crystal display element (LCD) and a touch panel 3 formed by providing a thin film electrode (operation key) over an upper surface of the display unit 2. The information terminal device 1 has, on a back surface thereof, a camera (not shown) that is used to take an image of a subject or to read a bar code. The information terminal device 1 of this embodiment further has push type operation buttons 4, 5, and 6 around the display unit 2 (on a left side of the display unit 2, in FIG. 1). The operation button 4, the operation button 5, and the operation button 6 respectively function as a power switch, as a camera activation switch, and as a bar code reader activation switch. The information terminal device 1 further has an LED (indicating lamp) 7 above these operation buttons.

Typically, a user uses the information terminal device 1 in such a manner in which the user turns the power on by pressing the operation button 4, holds a main body with one hand, and touches the touch panel 3 or presses the operation buttons 4, 5, and 6 with a finger of the other hand.

Figure 2:
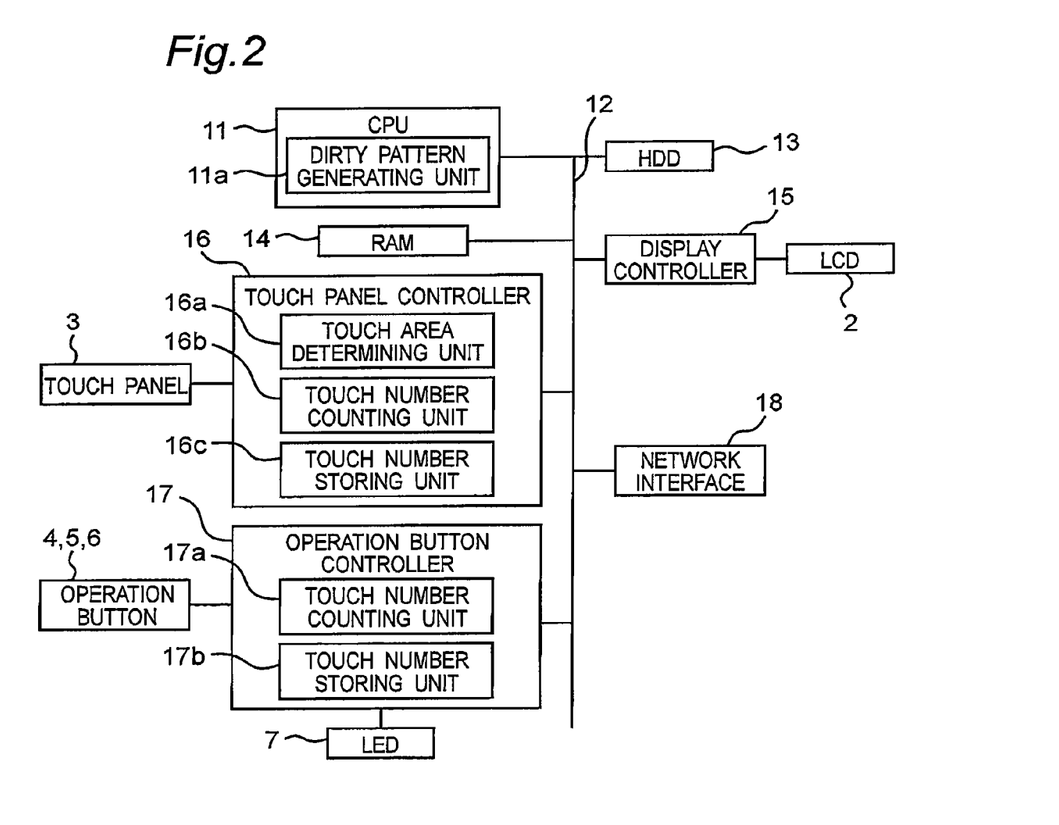
FIG. 2 is a block diagram illustrating an electrical configuration of the information terminal device of the one embodiment according to the present invention.

FIG. 2 is a block diagram illustrating an electrical configuration of the information terminal device 1 according to this embodiment. Referring to FIG. 2, the information terminal device 1 further has a CPU 11 as a processor that controls an entire process of the information terminal device 1, a touch panel controller 16 that controls the touch panel 3, an operation button controller 17 that controls the operation buttons 4, 5 and 6, a display controller 15 that controls the display unit 2, and a network interface 18.

The CPU 11 loads an OS (operating system) and various application programs stored in a HDD (hard disk drive) 13 to a main memory (RAM) 14 via a system bus 12 for mutually exchanging information and executes the programs. The CPU 11 controls the information terminal device 1 by switching between operation modes including a normal mode for operating according to operations of the touch panel 3 and the operation buttons 4, 5 and 6, and a cleaning mode for cleaning the touch panel. Within the CPU 11, a dirty pattern generating unit 11a that generates a dirty pattern is provided as a software function (for the dirty pattern, a detailed description will be given later).

The display controller 15 converts image data generated by the OS and the application programs into a display signal and outputs the converted signal to the display unit 2.

The touch panel controller 16 detects the operation of the touch panel 3, and transmits the detected operation to the CPU 11 directly or through a process described later. As means for realizing the process, a touch area determining unit 16a, a touch number counting unit 16b, and a touch number storing unit 16c are provided. The touch area determining unit 16a judges which area (operation key) has been touched. The touch number counting unit 16b counts number of times of touching each area (operation key). The touch number storing unit 16c stores a value counted by the touch number counting unit 16b for each area (operation key).

The operation button controller 17 detects the operation of the operation buttons 4, 5 and 6, and transmits the detected operation to the CPU 11 directly or through a process described later. As means for realizing the process, a touch number counting unit 17a and a touch number storing unit 17b are provided. The touch number counting unit 17a counts a number of times of pressing each operation button. The touch number storing unit 17b stores a value counted by the touch number counting unit 17a for each operation button.

The network interface 18 is an end terminal or a wireless communication unit for connecting to a LAN (Local Area Network). The information terminal device 1 collects information from a data server (not shown) connected to the LAN via the network interface 18.

2. Operation of Information Terminal Device

Figure 3:
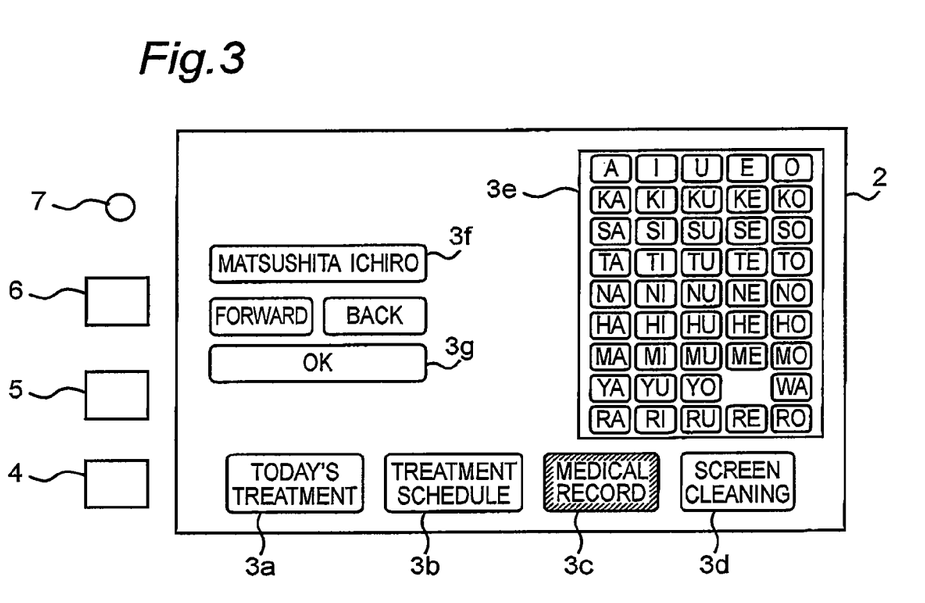
FIG. 3 is a diagram illustrating a configurational example of a touch panel unit of the information terminal device shown in FIG. 1.

First, an example of the operation of the touch panel 3 of the information terminal device 1 according to this embodiment is described. FIG. 3 is a diagram of a configurational example of the touch panel 3, illustrating an example in which the information terminal device 1 is used as a terminal device in an intra-hospital information system. Operation keys 3a to 3c on the touch panel 3 are operation keys for respectively selecting service menu items of the intra-hospital information system. FIG. 3 shows a state in which the operation key 3c has been touched and a menu item "medical record" is being selected.

In this state, a kana character pad 3e for inputting a name of a patient is displayed on a screen of the display unit 2, and by the user touching "ma, tu, si, ta, i, ti, ro, u", for example, the name of the patient (Matsushita ichiro) is displayed in a name box 3f. Subsequently, when the user touches an operation key ("OK key") 3g, medical records of the patient is displayed on the display unit 2 (not shown in the drawing).

An operation key 3d is a cleaning key for switching the information terminal device 1 to the cleaning mode for cleaning the touch panel 3 (a detailed description will be given later). Next, using FIG. 4 to FIG. 11, the operation of the information terminal device 1 is described with reference to FIG. 1 to FIG. 3.

Figure 4:
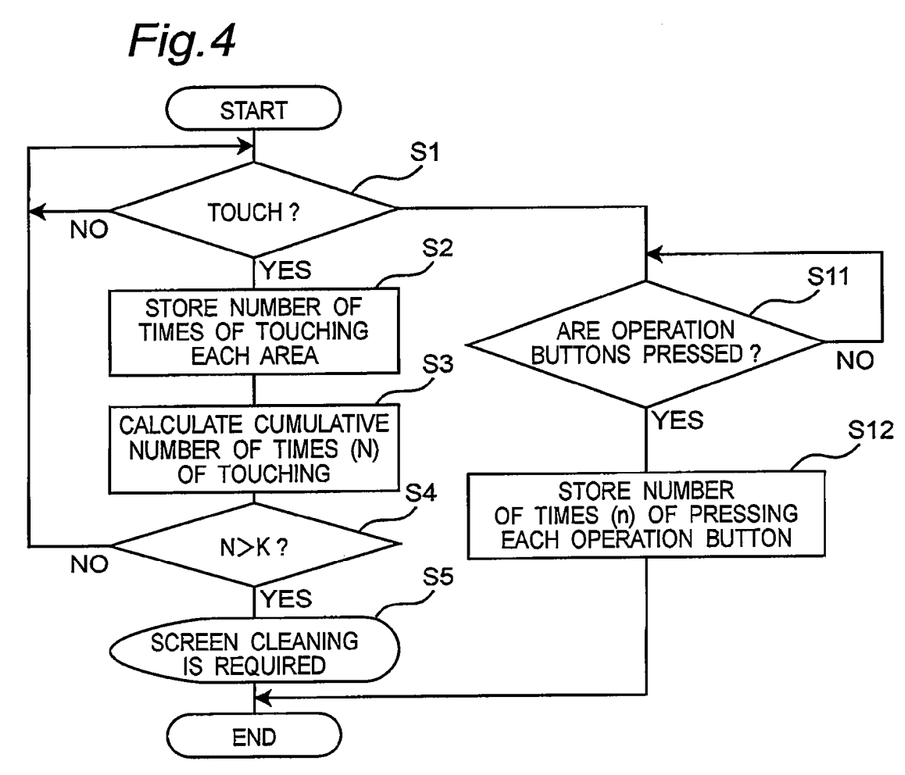
FIG. 4 is a flowchart showing a normal operation of the information terminal device of the embodiment according to the present invention.

FIG. 4 is a flowchart showing an operation in a normal use (in the normal mode). As used herein, the operation in the normal use refers to operations of the touch panel controller 16, the operation button controller 17, and the CPU 11 in a state in which the information terminal device 1 is used in the intra-hospital information system.

The touch panel controller 16 judges whether or not the touch panel 3 has been touched (step S1). If the touching of the touch panel 3 is detected, the touch area determining unit 16a judges which area (which operation key) has been touched based on the touched area, and the touch number counting unit 16b counts (accumulates) the number of times of touching each area (each operation key), and the counted number of times of touching is stored in the touch number storing unit 16c (step S2).

In the normal use (in the normal mode), the touch panel controller 16 obtains a cumulative number of times N of touching all the areas (all the operation keys) based on the number of times of touching each area stored in the touch number storing unit 16c (step S3), and determines whether or not the cumulative number of times N of touching has reached a predetermined value K (step S4). In step S4, if the cumulative number of times N of touching has not reached the predetermined value K (No in S4), the process returns to step S1, and the step S1 to step S3 are repeated. If the cumulative number of times N of touching has reached the predetermined value K in step S4 (Yes in S5), the touch panel controller 16 transmits, to the CPU 11, information indicating that the cumulative number of times N of touching has been reached the predetermined value K. The CPU 11 generates a message notifying that the screen cleaning is required, and displays the message on the display unit 2 as shown in FIG. 5A (step S5).

On the other hand, the operation button controller 17 detects the pressing of the operation buttons 4, 5 and 6 (step S11), adds the number of times of pressing each operation button by the touch number counting unit 17a, and stores the number of times in the touch number storing unit 17b (step S12).

In this manner, in the normal use (in the normal mode), the number of times of touching the touch panel 3 and the numbers of time of pressing the operation buttons 4, 5 and 6 are respectively counted. The counted numbers are referred in the cleaning mode.

Figure 5A:
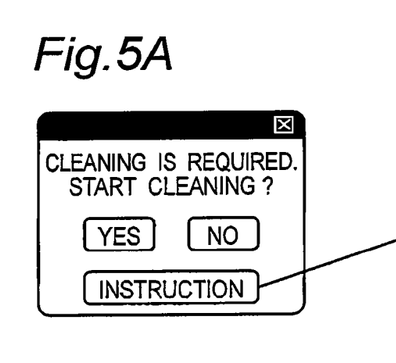
FIG. 5A is an example of a message inquiring if the cleaning is to be carried out.
Figure 5B:
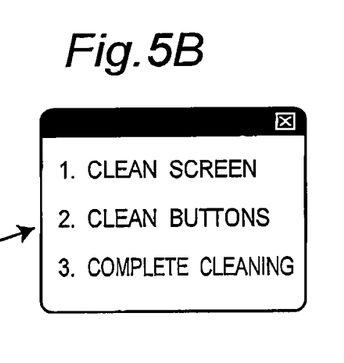
FIG. 5B is an example showing a flow of the cleaning.

FIG. 5A is one example of a message notifying that the screen cleaning is required. If the user touches a "YES" key in a state in which this message is displayed, the information terminal device 1 enters the cleaning mode. If the user touches a "NO" key, the information terminal device 1 continues the operation in the normal mode. In FIG. 5A, if the user touches an instruction key, the information terminal device 1 displays procedures of the cleaning on the display unit 2 as shown in FIG. 5B. With this, the information terminal device 1 prompts the user to first clean the touch panel 3, and then clean the operation buttons 4 to 6 surrounding the touch panel 3 to complete the cleaning. Typically, the cleaning by the user is carried out by manually pressing such as a cloth impregnated with a sterilization agent against the touch panel or the operation buttons.

Figure 6:
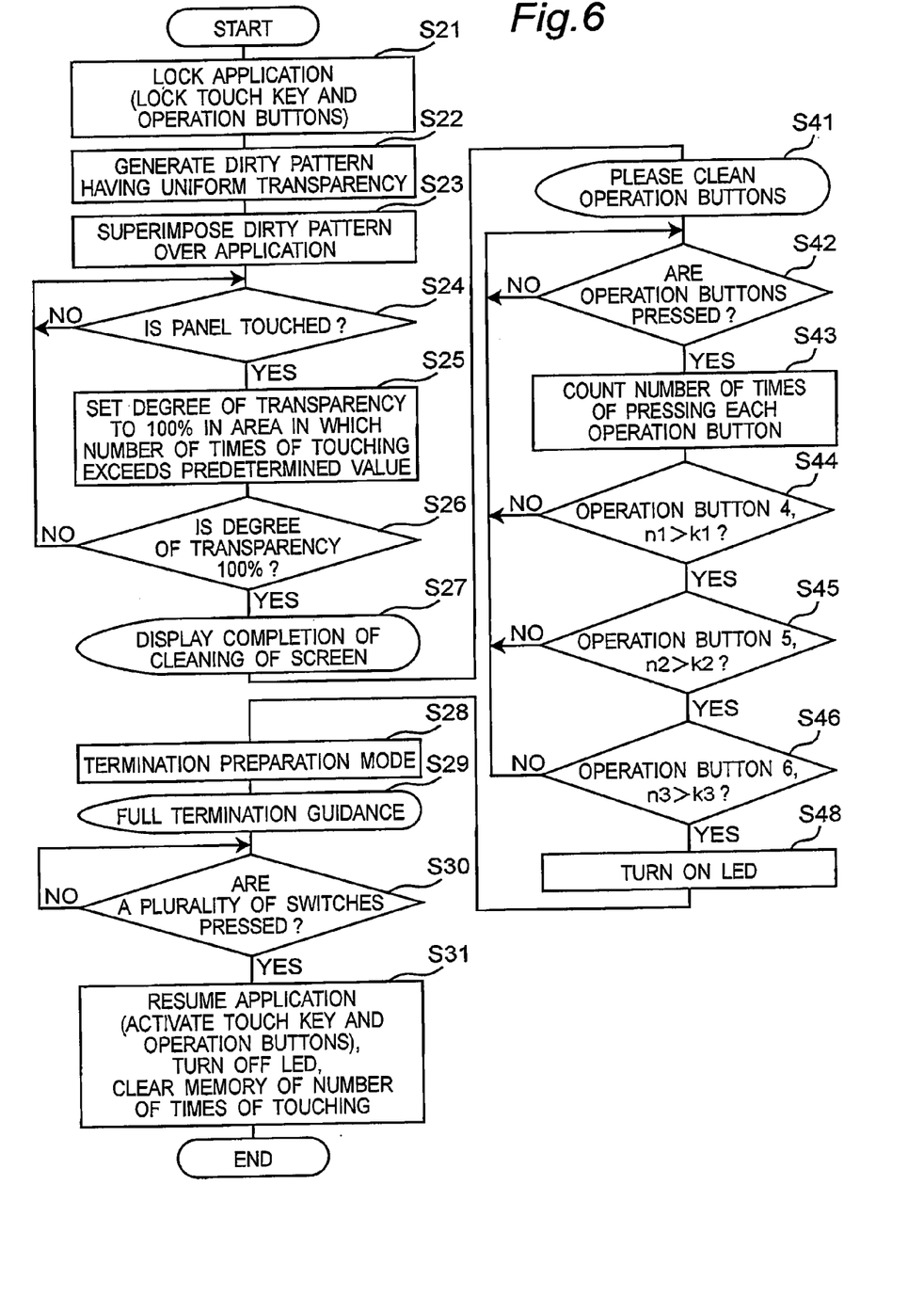
FIG. 6 is a flowchart showing a series of a cleaning operation of the information terminal device of the embodiment according to the present invention.

FIG. 6 is a flowchart showing operations of the CPU 11, the touch panel controller 16, and the operation button controller 17, in the cleaning mode, of the information terminal device 1 according to this embodiment. The CPU 11 executes a series of cleaning operation in the cleaning mode based on information from the touch panel controller 16 and the operation button controller 17.

The information terminal device 1 executes the cleaning mode in a state in which the power is turned on. The cleaning mode starts either when the user touches the "YES" key in the display of the message shown in FIG. 5A, or when the user touches the operation key (screen cleaning key) 3d shown in FIG. 3 at an arbitrary timing. Alternatively, although not shown in the drawing, an icon for activating a cleaning mode utility can be displayed under the display unit 2, and the user touching the icon can start the cleaning mode. Moreover, a time period lapsed after the cleaning has been completed can be counted by a timer, and the message shown in FIG. 5A can be displayed automatically when a predetermined time period lapses, thereby prompting the user to start the cleaning.

First, the cleaning of the screen (display unit) centering on the touch panel controller 16 is described. Upon entering the cleaning mode, the CPU 11 locks an application that is being run and prohibits the operation of the operation keys of the touch panel 3 on the display unit 2 (step S21). At the same time, the CPU 11 locks the operation buttons 4, 5 and 6 around the display unit 2 so that the operation buttons 4, 5 and 6 may not respond when pressed.

Figure 7:
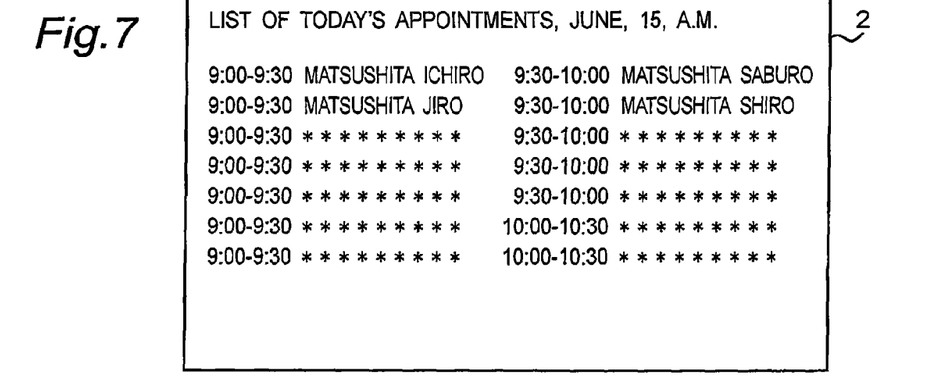
FIG. 7 is a diagram illustrating a state in which an application is suspended in the information terminal device of the embodiment according to the present invention.

The above state is shown in FIG. 7. FIG. 7 shows a state in which the operation keys 3a, 3b, 3c, and 3d and the like are hidden while a list of appointments is displayed by touching the operation key 3a (today's treatment key) in the screen shown in FIG. 3. As shown in FIG. 7, the CPU 11 hides the operation keys when prohibiting the operation of the application by the operation keys of the touch panel 3 on the display unit 2.

Figure 8A:
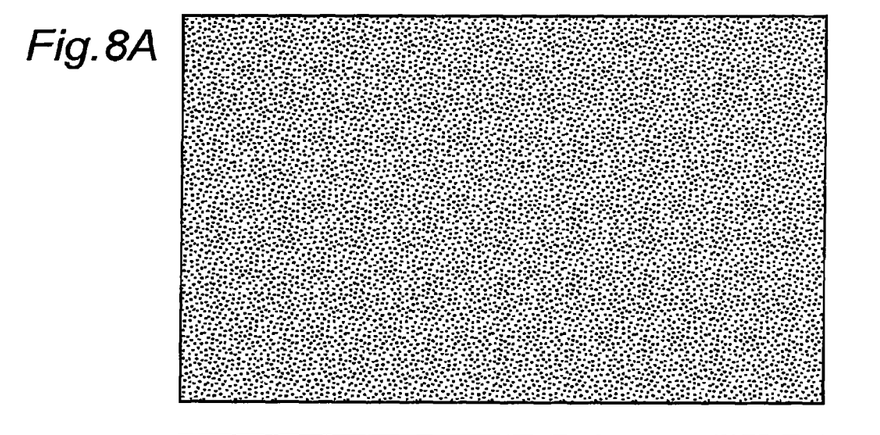
FIG. 8A shows an example of the dirty pattern.

The dirty pattern generating unit 11a generates a dirty pattern as shown in FIG. 8A (step S22). In this embodiment, the dirty pattern is a translucent pattern having an equal degree of transparency in all areas. The degree of transparency can be arbitrarily set. In this embodiment, at the point when the cleaning mode starts, the CPU 11 accesses the touch panel controller 16 and determines the degree of transparency according to the number of times of touching stored in the touch number storing unit 16c during the normal use (in the normal mode). The degree of transparency is set low (high turbidity) if number of times of touching is large, and the degree of transparency is set high (low turbidity) if number of times of touching is small. In this embodiment, the degree of transparency is set based on a cumulated number of times of touching all of the operation keys. Here, an explanation is given assuming the degree of transparency of the dirty pattern before the cleaning is 50%.

Figure 8B:
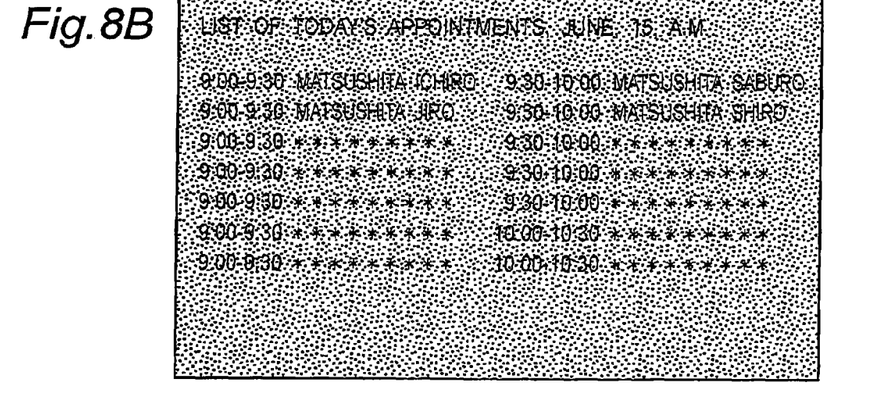
FIG. 8B shows an example in which the dirty pattern is superimposed over an application screen.

The CPU 11 displays the generated dirty pattern superimposing over an application screen of the display unit 2 (step S23). This state is shown in FIG. 8B. FIG. 8B shows a state in which the dirty pattern shown in FIG. 8A is lapped over the application screen shown in FIG. 7, expressing degree of smudge of the surface while the application screen is displayed.

The touch panel controller 16 detects the presence or absence of touching of the panel (step S24). The touching of the panel occurs by the user carrying out the cleaning work. The touch panel controller 16 detects a cleaning state of the touch panel 3 by detecting the touching of the panel for each area during the cleaning mode.

Figure 9:
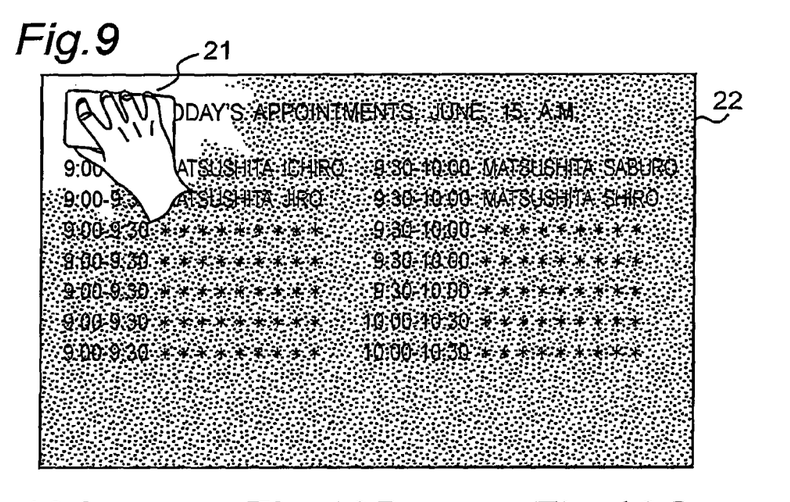
FIG. 9 is a diagram illustrating a state in which the cleaning is being carried out in the information terminal device of the embodiment according to the present invention.

The touch panel controller 16 transmits detected information to the CPU 11 upon detecting. The CPU 11 modifies the degree of transparency of the dirty pattern for each area according to the number of times of touching, and displays the modified dirty pattern on the display unit 2 (step S25). The state in which the cleaning is being carried out is shown in FIG. 9. In FIG. 9, the degree of transparency in an area 21 that has been cleaned is 100%, and the degree of transparency in an area 22 that has not been cleaned yet is still 50%. The CPU 11 determines whether or not the degree of transparency should be changed to 100% based on whether or not the number of times of touching each area exceeds a predetermined value that is determined based on the cumulative number of times of touching during the normal mode. By this, the user can see areas that are not cleaned yet just by looking.

Figure 10A:
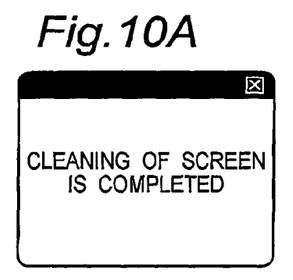
FIG. 10A is a display example notifying that the cleaning of the touch panel has been completed.

The CPU 11 judges whether or not the degree of transparency is 100% for all the areas (step S26). The CPU 11 displays a message notifying that the screen cleaning has been completed as shown in FIG. 10A on the display unit 2, at the point when the degree of transparency for all the areas reach 100% (step S27).

Upon completion of the cleaning of the screen, the CPU 11 displays a message urging the cleaning of operation buttons (not shown in the drawing) on the display unit 2 (step S41). With this, the user moves to the cleaning of the operation buttons. The operation button controller 17 checks whether or not the operation buttons 4 to 6 have been pressed (step S42), and counts the number of times of pressing each operation button by the touch number counting unit 17a (step S43). The operation button controller 17 compares the numbers of times n1 to n3 of pressing the operation buttons respectively with corresponding predetermined values (reference values) k1 to k3 (step S44 to step S46).

Here, the predetermined values k1 to k3 are value of number of times determined based on the number of times of pressing each operation button stored in the touch number storing unit 17b in step S12 of FIG. 4, and as the number of times of pressing is larger, the value becomes larger. For example, the predetermined value is a value that increases by 1 every 500 times of the pressing. This is because as the operation button with larger number of times of pressing is more turbid, it is necessary to set number of times of wiping in the cleaning larger. The predetermined value is set so that the number of times of wiping increases according to the number of times of pressing. For example, if the number of times of pressing an operation button is no greater than 500, the number of times of wiping the operation button may be 1, and if the number of times of pressing an operation button is no smaller than 500 and is smaller than 1000, the number of times of wiping the operation button may be required to be 2. It should be appreciated that these numbers of times of pressing and the numbers of times of wiping are mere examples, and do not limit the present invention in any way. Further, the number of times of wiping does not have to be changed according to the number of times of pressing, and the cleaning may be always completed when the wiping of a predetermined number of times has been done.

Figure 10B:
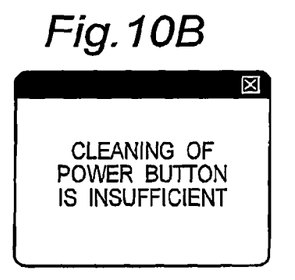
FIG. 10B is a display example notifying that the cleaning of operation buttons is insufficient.

In step S44 to step S46, when the predetermined number of times of pressing (wiping) the operation button is not satisfied a message indicating that the cleaning is insufficient, as shown in FIG. 10B, can be displayed on the display unit 2. For example, after the number of times of pressing at least one of the plurality of operation buttons reaches the predetermined number of times, a name of the other operation buttons can be displayed on the display unit 2 when the number of times of wiping the other operation buttons does not satisfy the predetermined number of times. FIG. 10B shows that the wiping of the power button does not reach the predetermined number of times. With this, the user can focus on the wiping work of the power button and carry out the wiping work more efficiently.

When the number of times of pressing each of all the operation buttons satisfies the respective predetermined value, the CPU 11 causes the LED 7 to emit light, and notifies the user of the completion of the cleaning of the operation buttons (step S48).

Figure 10C:
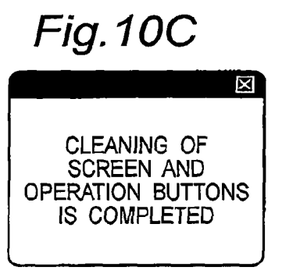
FIG. 10C is a display example notifying that the cleaning of the touch panel and the operation buttons has been completed.

The CPU 11 checks that the cleaning of both the screen (touch panel) and the operation buttons has been completed, and moves to a mode for termination preparation (step S28). The CPU 11 displays a message indicating that the cleaning of both the screen and the operation buttons has been completed, as shown in FIG. 10C, on the display unit 2 (step S29).

Figure 11:
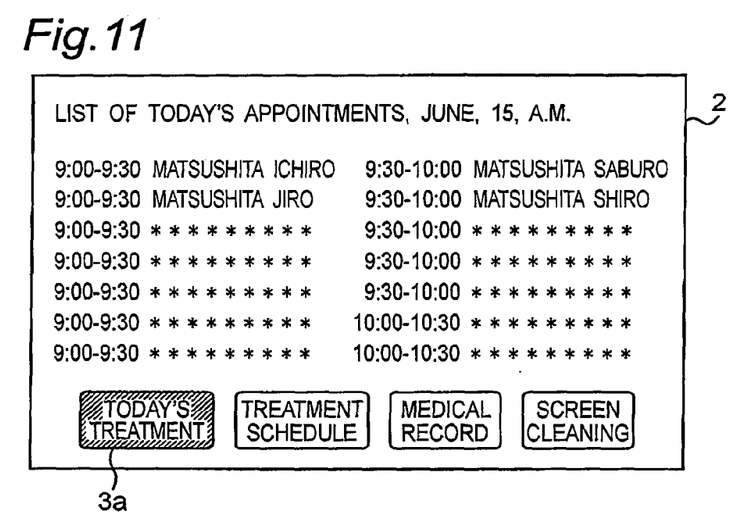
FIG. 11 is a diagram illustrating a state of a display unit after the application is resumed in the information terminal device of the embodiment according to the present invention.

The CPU 11 checks whether or not more than one operation button (two or three of the operation buttons 4 to 6) is pressed at the same time (step S30), and executes a termination operation of the cleaning mode when more than one operation button is pressed at the same time (step S31). Specifically, the information terminal device 1 cancels the prohibited state of the touch panel 3 and the operation buttons 4 to 6, turns off the LED 7, and resets the numbers of times of touching stored in the touch number storing unit 16c and the touch number storing unit 17b to zero. In this manner, by terminating the cleaning mode after checking the pressing of more than one button, it is possible to terminate the cleaning mode when the user finally determines the completion of the cleaning, thereby improving the convenience. For example, in a case in which the user wishes to continue the cleaning while the information terminal device 1 determines that the cleaning has been completed, it is possible to avoid automatically terminating the cleaning mode. FIG. 11 is a diagram illustrating a state of the display unit after the operation of the application is resumed. As shown in FIG. 11, when the operation of the application is resumed, the CPU 11 displays the operation keys under a list of treatment appointments. With this, the user can resume the operation of the information terminal device 1 by pressing the operation keys.

3. Conclusion

As described above, the information terminal device 1 according to the present invention is configured to store the numbers of times of pressing each of the operation buttons in the normal use, and, when the cleaning mode is selected, to terminate the cleaning mode when the numbers of times of pressing the operation buttons by the wipe cleaning respectively reach the predetermined numbers corresponding to the stored numbers of times of pressing operation buttons. Accordingly, the user can carry out the cleaning of the operation buttons more sufficiently. Even if the number of times of touching the button in the normal mode is large and the degree of smudge high, for example, it is possible to sufficiently remove the smudge. The user can carry out the wiping naturally according to the degree of smudge, without conscious effort, and the operation buttons can be cleaned uniformly and sufficiently.

While, in this embodiment, the judgment for each area of the touch panel 3 on whether the cleaning has been completed in step S25 of FIG. 6 is carried out using the same predetermined value for all the areas, predetermined values that are different from area to area can also be used. For example, it is possible to determine whether or not the cleaning of the area has been completed, by setting different predetermined values for the respective areas based on the number of times of touching the respective areas counted in the normal mode, and comparing the number of times of touching each area in the cleaning mode with the corresponding predetermined value.

While the predetermined value in step S25 of FIG. 6 is a value determined based on the cumulative number of times of touching in the normal mode, the predetermined value may be a value that has been previously set. Further, in the present embodiment, only the predetermined value for changing the degree of transparency to 100% (that is, the reference for the completion of the cleaning) is set, and the degree of transparency is changed to 100% when the number of times of touching exceeds the predetermined value. However, a plurality of predetermined values can be provided so that the degree of transparency can eventually change to 100%. For example, the degree of transparency can be changed to 60%, 70%, 80%, and so on when the number of times of touching exceeds a first predetermined value, a second predetermined value, a third predetermined value, and so on, respectively. Further, whether or not the cleaning of the area has been done can be determined based on the number of times of touching, and, for example, the degree of transparency can be changed to 100% when the area is started to be touched (cleaned) more than twice.

While, in this embodiment, the degree of transparency of the dirty pattern generated in step S22 is the same for all the areas, the degree of transparency of the dirty pattern can be different from area to area. In this case, the degree of transparency for each area can be determined based on the degree of the number of times of touching each area counted in the normal mode as explained in FIG. 4. While, in this embodiment, the degree of transparency of the dirty pattern is determined based on the number of times of touching, the degree of transparency can be a predetermined degree of transparency.

In the present embodiment, the cleaning mode is terminated when the plurality of operation buttons are pressed at the same time in step S30. It is preferable that the operation buttons that are pressed in this case are provided at distant positions. With this, it is possible to prevent the termination operation of the cleaning mode from being carried out accidentally during the cleaning. For example, when the termination operation is carried out by two buttons being pressed at the same time, it is preferable that these buttons are the operation button 4 and the operation button 6 in the case of FIG. 1.

While, in the present embodiment, the cleaning mode is terminated and the application is resumed when the plurality of operation buttons are pressed at the same time in step S30, the cleaning mode can be terminated after a predetermined time period lapses regardless of the operation of the operation buttons in step S30. Alternatively, it may not be necessary to provide step S30.

In this case, after a message indicating that the cleaning for both the screen and operation buttons has been completed is displayed on the display unit 2 (step S29), the application is automatically resumed (step S31).

In the present embodiment, the screen to prompt the cleaning of the screen shown in FIG. 5A is displayed when the cumulative number of times N of touching every operation key reaches the predetermined value K. However, the condition for displaying the screen to prompt the cleaning of the screen is not limited to this embodiment. For example, the screen to prompt the cleaning of the screen may be displayed when the number of times of touching any one of the operation keys exceeds a predetermined value. Further, in the present embodiment, the screen to prompt the cleaning of the screen shown in FIG. 5A is displayed when the cumulative number of times N of touching the touch panel 3 reaches the predetermined value K. However, the screen to prompt the cleaning of the screen can be displayed when the number of times pressing the operation button (for example, the cumulative number of times of pressing one or all of the operation buttons) exceeds the predetermined value.

While the description is given assuming that the operation buttons are buttons of press type, the present invention is not limited to this. The present invention can be put into practice as long as means for detecting an operation by contact such as an optical sensor or a pressure sensitive sensor are used instead of the operation buttons.

The present invention has an advantageous effect that allows sufficient removal of smudge of operation buttons provided for an information terminal device, and is useful for stationary information terminal devices, for example, a device having a keyboard such as personal computers, in addition to portable information terminal devices.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2008-202817, filed on Aug. 6, 2008, which is expressly incorporated herein by reference in its entirety.

What is claimed is:

1. An information terminal device comprising:
a touch panel;
a display that is integrally configured with the touch panel;
a plurality of operation buttons provided around the display and outside the touch panel;
a touch number counter configured to count a number of times that each of the operation buttons is touched;

a touch number storage configured to store the number of times counted by the touch number counter; and a controller configured to control the information terminal device by switching an operation mode between a normal mode for working the information terminal device according to operations of the touch panel and the operation buttons and a cleaning mode for cleaning the touch panel, wherein in the cleaning mode, the controller prohibits an application from being executed according to operations of the touch panel and the operation buttons, and terminates the cleaning mode when the number of times that each of the operation buttons is touched, counted by the touch number counter, reaches a predetermined number, wherein the touch number counter counts the number of times that each operation button is touched in the normal mode, and the predetermined number for each operation button is determined when the cleaning mode starts, based on the number of times that each operation button is touched, counted in the normal mode and stored in the touch number storage.

2. The information terminal device according to claim 1, wherein in the cleaning mode, the controller displays, on the display, a name of an operation button of the plurality of operation buttons of which the number of times that the operation button is touched is below the predetermined number, after the number of times that at least one of the plurality of operation buttons is touched reaches the predetermined number.

3. The information terminal device according to claim 1, wherein the controller terminates the cleaning mode, when two or more of the plurality of operation buttons are pressed at the same time after the number of times that each of the operation buttons is touched, counted by the touch number counter, reaches the corresponding predetermined number.

* * * * *